United States Patent
Kubo et al.

(10) Patent No.: US 12,288,844 B2
(45) Date of Patent: *Apr. 29, 2025

(54) SOLID ELECTROLYTE MATERIAL AND BATTERY USING SAME

(71) Applicant: Panasonic Intellectual Property Management Co., Ltd., Osaka (JP)

(72) Inventors: Takashi Kubo, Hyogo (JP); Kenta Nagamine, Osaka (JP); Keita Mizuno, Osaka (JP); Tetsuya Asano, Nara (JP); Akihiro Sakai, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 531 days.

This patent is subject to a terminal disclaimer.

(21) Appl. No.: 17/698,000

(22) Filed: Mar. 18, 2022

(65) Prior Publication Data

US 2022/0209291 A1 Jun. 30, 2022

Related U.S. Application Data

(63) Continuation of application No. PCT/JP2020/035414, filed on Sep. 18, 2020.

(30) Foreign Application Priority Data

Oct. 10, 2019 (JP) .................................. 2019-186817

(51) Int. Cl.
*H01M 10/0562* (2010.01)
*H01M 10/0525* (2010.01)

(52) U.S. Cl.
CPC ... *H01M 10/0562* (2013.01); *H01M 10/0525* (2013.01); *H01M 2300/008* (2013.01)

(58) Field of Classification Search
None
See application file for complete search history.

(56) References Cited

U.S. PATENT DOCUMENTS

| | | | |
|---|---|---|---|
| 2012/0301796 A1 | 11/2012 | Ohtomo et al. | |
| 2018/0108943 A1* | 4/2018 | Shin | C09D 123/0853 |
| 2018/0205112 A1 | 7/2018 | Thomas-Alyea et al. | |
| 2019/0088995 A1* | 3/2019 | Asano | H01M 10/052 |
| 2020/0020895 A1* | 1/2020 | Collins | H01M 10/0525 |
| 2021/0328262 A1 | 10/2021 | Nishio et al. | |

FOREIGN PATENT DOCUMENTS

| | | |
|---|---|---|
| EP | 3905277 A1 | 11/2021 |
| JP | 2006-244734 | 9/2006 |
| JP | 2011-129312 | 6/2011 |
| WO | 2018/025582 | 2/2018 |
| WO | 2020/137189 | 7/2020 |

OTHER PUBLICATIONS

International Search Report of PCT application No. PCT/JP2020/035414 dated Oct. 20, 2020.
EPC Office Action issued in European Patent Application No. 20874683.4, Oct. 12, 2022.

* cited by examiner

*Primary Examiner* — Wyatt P McConnell
(74) *Attorney, Agent, or Firm* — GREENBLUM & BERNSTEIN, P.L.C.

(57) ABSTRACT

A solid electrolyte material includes Li, Ca, Y, Gd, and X wherein X is at least one element selected from the group consisting of F, Cl, Br, and I. A battery uses the solid electrolyte material.

9 Claims, 2 Drawing Sheets

SOLID ELECTROLYTE MATERIAL AND BATTERY USING SAME

BACKGROUND

1. Technical Field

The present disclosure relates to a solid electrolyte material and a battery using it.

2. Description of the Related Art

Japanese Unexamined Patent Application Publication No. 2011-129312 (PTL 1) discloses an all solid battery using a sulfide solid electrolyte.

International Publication No. WO 2018/025582 (PTL 2) discloses a solid electrolyte material represented by a composition formula: $Li_{6-3z}Y_zX_6$ (0<z<2, X=Cl or Br).

SUMMARY

One non-limiting and exemplary embodiment provides a solid electrolyte material having a high lithium ion conductivity.

In one general aspect, the techniques disclosed here feature a solid electrolyte material including Li, Ca, Y, Gd, and X, wherein X is at least one element selected from the group consisting of F, Cl, Br, and I.

The present disclosure provides a solid electrolyte material having a high lithium ion conductivity.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTIONS

Figure 1:
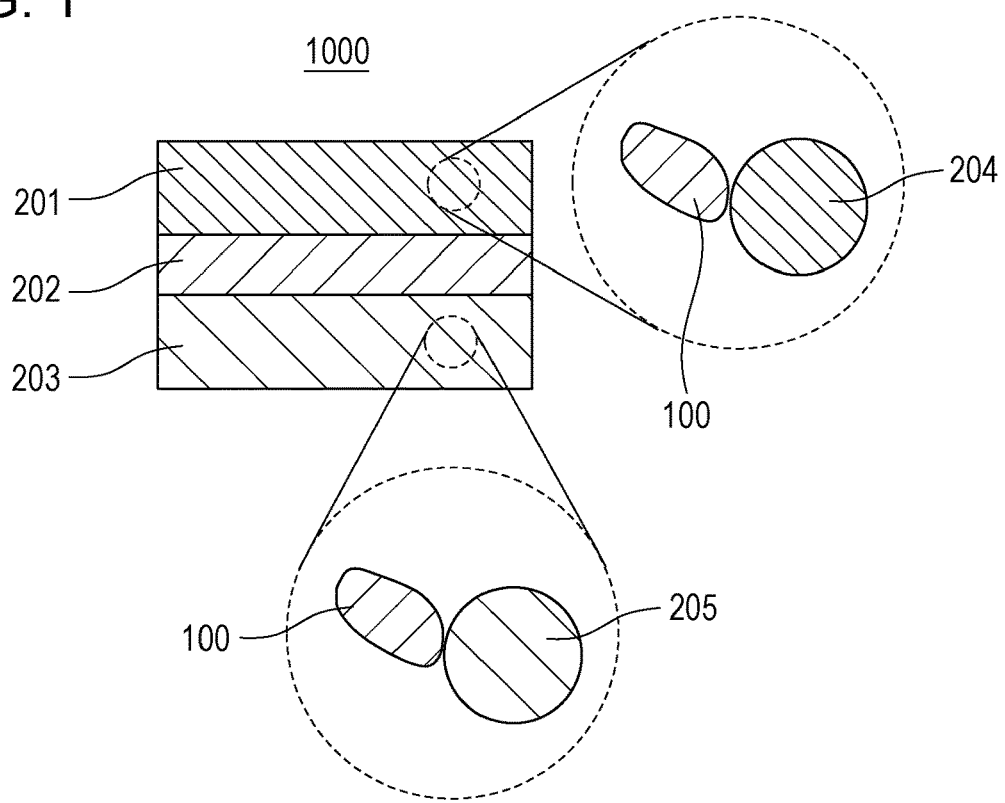
FIG. 1 is a cross-sectional view of a battery 1000 according to a second embodiment.

Embodiments of the present disclosure will now be described with reference to the drawings.

First Embodiment

The solid electrolyte material according to a first embodiment includes Li, Ca, Y, Gd, and X. X is at least one element selected from the group consisting of F, Cl, Br, and I.

The solid electrolyte material according to the first embodiment has a high lithium ion conductivity. Accordingly, the solid electrolyte material according to the first embodiment may be used for obtaining a battery having excellent charge and discharge characteristics. An example of the battery is an all solid secondary battery.

The solid electrolyte material according to the first embodiment desirably does not contain sulfur. A solid electrolyte material not containing sulfur does not generate hydrogen sulfide, even if it is exposed to the atmosphere, and is therefore excellent in safety. Such a solid electrolyte material may be used for obtaining a battery having excellent safety. It should be kept in mind that hydrogen sulfide may be generated when the sulfide solid electrolyte disclosed in PTL 1 is exposed to the atmosphere.

In order to enhance the ion conductivity of the solid electrolyte material, the solid electrolyte material according to the first embodiment may consist essentially of Li, Ca, Y, Gd, and X. Here, the phrase "the solid electrolyte material according to the first embodiment consists essentially of Li, Ca, Y, Gd, and X" means that the molar proportion of the sum of the amounts of Li, Ca, Y, Gd, and X to the sum of the amounts of all elements constituting the solid electrolyte material according to the first embodiment is 90% or more. As an example, the molar proportion may be 95% or more.

The solid electrolyte material according to the first embodiment may contain elements that are unavoidably mixed. Examples of the elements are hydrogen, nitrogen, and oxygen. These elements may be present in the raw material powders of the solid electrolyte material or in the atmosphere for manufacturing or storing the solid electrolyte material.

X may be at least one element selected from the group consisting of Cl and Br. Such a solid electrolyte material has a high lithium ion conductivity.

The solid electrolyte material according to the first embodiment may be a material represented by the following composition formula (1):

$$Li_{6-2a-3d}Ca_a(Y_{1-b}Gd_b)_dBr_{6-c}Cl_c \qquad (1)$$

where the following mathematical expressions:

$0<a<3;$ $0<b<1;$ $0<c<6;$ and $0<d<1.5$ are satisfied. The material represented by the composition formula (1) has a high lithium ion conductivity.

In order to enhance the ion conductivity of the solid electrolyte material, the composition formula (1) may satisfy a mathematical expression: $0.01 \leq a \leq 0.3$ or may satisfy a mathematical expression: $0.05 \leq a \leq 0.3$. In order to further enhance the ion conductivity of the solid electrolyte material, a mathematical expression: $0.01 \leq a \leq 0.2$ or $0.05 \leq a \leq 0.2$ may be satisfied. In order to further enhance the ion conductivity of the solid electrolyte material, a mathematical expression: $0.01 \leq a \leq 0.15$ or $0.05 \leq a \leq 0.15$ may be satisfied. In order to further enhance the ion conductivity of the solid electrolyte material, a mathematical expression: $0.01 \leq a \leq 0.1$ or $0.05 \leq a \leq 0.1$ may be satisfied.

In order to enhance the ion conductivity of the solid electrolyte material, the composition formula (1) may satisfy a mathematical expression: $0.8 \leq d \leq 1.2$. In order to further enhance the ion conductivity of the solid electrolyte material, a mathematical expression: $1.1 \leq d \leq 1.2$ may be satisfied.

The solid electrolyte material according to the first embodiment may be crystalline or amorphous.

The shape of the solid electrolyte material according to the first embodiment is not limited. Examples of the shape are needle, spherical, and oval spherical shapes. The solid electrolyte material according to the first embodiment may be a particle. The solid electrolyte material according to the first embodiment may be formed so as to have a pellet shape or a planar shape.

For example, when the solid electrolyte material according to the first embodiment has a particulate shape (e.g., spherical), the solid electrolyte material according to the first embodiment may have a median diameter of 0.1 μm or more and 100 μm or less. The median diameter means the particle size at which the accumulated deposition is 50% in a volume-based particle size distribution. The volume-based particle size distribution is measured with, for example, a laser diffraction measurement apparatus or an image analyzer.

The solid electrolyte material according to the first embodiment may have a median diameter of 0.5 μm or more and 10 μm or less. Consequently, the first solid electrolyte material has a higher ion conductivity. Furthermore, the solid electrolyte material according to the first embodiment and another material such as an active material may be well dispersed.

The solid electrolyte material according to the first embodiment may have a median diameter smaller than that of an active material. Consequently, the solid electrolyte material according to the first embodiment and the active material may be well dispersed.

Method for Manufacturing Solid Electrolyte Material

The solid electrolyte material according to the first embodiment is manufactured by, for example, the following method.

Two or more raw material powders of halides are mixed so as to have a desired composition.

As an example, when the target composition is $Li_{2.9}Ca_{0.05}Y_{0.6}Gd_{0.4}Br_2Cl_4$, a LiCl raw material powder, a LiBr raw material powder, a $YCl_3$ raw material powder, a $GdCl_3$ raw material powder, and a $CaBr_2$ raw material powder (i.e., raw material powders of five halides) are mixed such that the molar ratio of $LiCl:LiBr:YCl_3:GdCl_3:CaBr_2$ is approximately 1:1.9:0.6:0.4:0.05. The raw material powders may be mixed at a molar ratio adjusted in advance so as to offset a composition change that may occur in the synthesis process.

The raw material powders are mechanochemically reacted (by a mechanochemical milling method) with each other in a mixing apparatus such as a planetary ball mill to obtain a reaction product. The reaction product may be heat-treated in vacuum or in an inert atmosphere. Alternatively, a mixture of the raw material powders may be heat-treated in vacuum or in an inert gas atmosphere to obtain a reaction product.

The solid electrolyte material according to the first embodiment may be obtained by these methods.

Second Embodiment

A second embodiment will now be described. The matters described in the first embodiment may be omitted as appropriate.

In the second embodiment, an electrochemical device using the solid electrolyte material according to the first embodiment will be described. An example of the electrochemical device according to the second embodiment, a battery will now be described.

The battery according to the second embodiment includes a positive electrode, an electrolyte layer, and a negative electrode. The electrolyte layer is disposed between the positive electrode and the negative electrode. At least one selected from the group consisting of the positive electrode, the electrolyte layer, and the negative electrode contains the solid electrolyte material according to the first embodiment. The battery according to the second embodiment contains the solid electrolyte material according to the first embodiment and therefore has excellent charge and discharge characteristics.

The battery according to the second embodiment may be an all solid battery.

FIG. 1 is a cross-sectional view of a battery 1000 according to the second embodiment.

The battery 1000 includes a positive electrode 201, an electrolyte layer 202, and a negative electrode 203. The electrolyte layer 202 is disposed between the positive electrode 201 and the negative electrode 203.

The positive electrode 201 contains a positive electrode active material particle 204 and a solid electrolyte particle 100.

The electrolyte layer 202 contains an electrolyte material (e.g., a solid electrolyte material).

The negative electrode 203 contains a negative electrode active material particle 205 and a solid electrolyte particle 100.

The solid electrolyte particle 100 is a particle consisting of the solid electrolyte material according to the first embodiment or a particle containing the solid electrolyte material according to the first embodiment as a main component.

The positive electrode 201 contains a material that can occlude and release metal ions such as lithium ions. The material is, for example, a positive electrode active material (e.g., the positive electrode active material particle 204).

Examples of the positive electrode active material are a lithium-containing transition metal oxide, a transition metal fluoride, a polyanionic material, a fluorinated polyanionic material, a transition metal sulfide, a transition metal oxyfluoride, a transition metal oxysulfide, and a transition metal oxynitride. Examples of the lithium-containing transition metal oxide are $Li(NiCoMn)O_2$, $Li(NiCoAl)O_2$, and $LiCoO_2$.

The positive electrode active material particle 204 may have a median diameter of 0.1 μm or more and 100 μm or less. When the positive electrode active material particle 204 has a median diameter of 0.1 μm or more, the positive electrode active material particle 204 and the solid electrolyte particle 100 may be well dispersed in the positive electrode 201. Consequently, the charge and discharge characteristics of the battery are improved. When the positive electrode active material particle 204 has a median diameter of 100 μm or less, the lithium diffusion speed in the positive electrode active material particle 204 is improved. Consequently, the battery may operate at a high output.

The positive electrode active material particle 204 may have a median diameter larger than that of the solid electrolyte particle 100. Consequently, the positive electrode active material particle 204 and the solid electrolyte particle 100 may be well dispersed.

From the viewpoint of the energy density and the output of the battery, in the positive electrode 201, the ratio of the volume of the positive electrode active material particle 204 to the sum of the volume of the positive electrode active material particle 204 and the volume of the solid electrolyte particle 100 may be 0.30 or more and 0.95 or less.

From the viewpoint of the energy density and the output of the battery, the positive electrode 201 may have a thickness of 10 μm or more and 500 μm or less.

The electrolyte layer 202 contains an electrolyte material. The electrolyte material is, for example, the solid electrolyte material according to the first embodiment. The electrolyte layer 202 may be a solid electrolyte layer.

The electrolyte layer 202 may be constituted of the solid electrolyte material according to the first embodiment only. Alternatively, the electrolyte layer 202 may be constituted of only a solid electrolyte material that is different from the solid electrolyte material according to the first embodiment.

Examples of the solid electrolyte material that is different from the solid electrolyte material according to the first embodiment are $Li_2MgX'_4$, $Li_2FeX'_4$, $Li(Al,Ga,In)X'_4$, $Li_3(Al,Ga,In)X'_6$, and LiI. Here, X' is at least one element selected from the group consisting of F, Cl, Br, and I.

Hereinafter, the solid electrolyte material according to the first embodiment is referred to as first solid electrolyte material. The solid electrolyte material that is different from the solid electrolyte material according to the first embodiment is referred to as second solid electrolyte material.

The electrolyte layer 202 may contain not only the first solid electrolyte material but also the second solid electrolyte material. The first solid electrolyte material and the second solid electrolyte material may be uniformly dispersed in the electrolyte layer 202. A layer made of the first solid electrolyte material and a layer made of the second solid electrolyte material may be stacked along the stacking direction of the battery 1000.

The electrolyte layer 202 may have a thickness of 1 μm or more and 1000 μm or less. When the electrolyte layer 202 has a thickness of 1 μm or more, the positive electrode 201 and the negative electrode 203 are unlikely to be short-circuited. When the electrolyte layer 202 has a thickness of 1000 μm or less, the battery may operate at a high output.

The negative electrode 203 contains a material that can occlude and release metal ions such as lithium ions. The material is, for example, a negative electrode active material (e.g., the negative electrode active material particle 205).

Examples of the negative electrode active material are a metal material, a carbon material, an oxide, a nitride, a tin compound, and a silicon compound. The metal material may be a single metal or an alloy. Examples of the metal material are a lithium metal and a lithium alloy. Examples of the carbon material are natural graphite, coke, graphitizing carbon, carbon fibers, spherical carbon, artificial graphite, and amorphous carbon. From the viewpoint of capacity density, suitable examples of the negative electrode active material are silicon (i.e., Si), tin (i.e., Sn), a silicon compound, and a tin compound.

The negative electrode active material particle 205 may have a median diameter of 0.1 μm or more and 100 μm or less. When the negative electrode active material particle 205 has a median diameter of 0.1 μm or more, the negative electrode active material particle 205 and the solid electrolyte particle 100 may be well dispersed in the negative electrode 203. Consequently, the charge and discharge characteristics of the battery are improved. When the negative electrode active material particle 205 has a median diameter of 100 μm or less, the lithium diffusion speed in the negative electrode active material particle 205 is improved. Consequently, the battery may operate at a high output.

The negative electrode active material particle 205 may have a median diameter larger than that of the solid electrolyte particle 100. Consequently, the negative electrode active material particle 205 and the solid electrolyte particle 100 may be well dispersed.

From the viewpoint of the energy density and the output of the battery, in the negative electrode 203, the ratio of the volume of the negative electrode active material particle 205 to the sum of the volume of the negative electrode active material particle 205 and the volume of the solid electrolyte particle 100 may be 0.30 or more and 0.95 or less.

From the viewpoint of the energy density and the output, the negative electrode 203 may have a thickness of 10 μm or more and 500 μm or less.

At least one selected from the group consisting of the positive electrode 201, the electrolyte layer 202, and the negative electrode 203 may contain the second solid electrolyte material for the purpose of enhancing the ion conductivity, chemical stability, and electrochemical stability.

As described above, the second solid electrolyte material may be a halide solid electrolyte Examples of the halide solid electrolyte are $Li_2MgX'_4$, $Li_2FeX'_4$, $Li(Al,Ga,In)X'_4$, $Li_3(Al,Ga,In)X'_6$, and LiI. Here, X' is at least one element selected from the group consisting of F, Cl, Br, and I.

Another example of the halide solid electrolyte is a compound represented by $Li_pMe_qY_rZ_6$. Here, p+m'q+3r=6 and r>0 are satisfied. Me is at least one element selected from the group consisting of metal elements and metalloid elements excluding Li and Y. The value of m' represents the valence of Me'. The "metalloid elements" are B, Si, Ge, As, Sb, and Te. The "metal elements" are all elements included in Groups 1 to 12 of the periodic table (however, hydrogen is excluded) and all elements included in Groups 13 to 16 in the periodic table (however, B, Si, Ge, As, Sb, Te, C, N, P, O, S, and Se are excluded). Me may be at least one element selected from the group consisting of Mg, Ca, Sr, Ba, Zn, Sc, Al, Ga, Bi, Zr, Hf, Ti, Sn, Ta, and Nb from the viewpoint of the ion conductivity of the halide solid electrolyte.

The second solid electrolyte material may be a sulfide solid electrolyte.

Examples of the sulfide solid electrolyte are $Li_2S—P_2S_5$, $Li_2S—SiS_2$, $Li_2S—B_2S_3$, $Li_2S—GeS_2$, $Li_{3.25}Ge_{0.25}P_{0.75}S_4$, and $Li_{10}GeP_2S_{12}$.

The second solid electrolyte material may be an oxide solid electrolyte.

Examples of the oxide solid electrolyte are:
(i) an NASICON-type solid electrolyte, such as $LiTi_2(PO_4)_3$ or its element substitute;
(ii) a perovskite-type solid electrolyte, such as (LaLi)$TiO_3$;
(iii) an LISICON-type solid electrolyte, such as $Li_{14}ZnGe_4O_{16}$, $Li_4SiO_4$, $LiGeO_4$, or its element substitute;
(iv) a garnet-type solid electrolyte, such as $Li_7La_3Zr_2O_{12}$ or its element substitute; and
(v) $Li_3PO_4$ or its N-substitute.

The second solid electrolyte material may be an organic polymer solid electrolyte.

Examples of the organic polymer solid electrolyte are a compound of a polymer compound and a lithium salt. The polymer compound may have an ethylene oxide structure. A polymer compound having an ethylene oxide structure can contain a large amount of a lithium salt and can therefore further enhance the ion conductivity.

Examples of the lithium salt are $LiPF_6$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(SO_2C_4F_9)$, and $LiC(SO_2CF_3)_3$. One lithium salt selected from these salts may be used alone, or a mixture of two or more lithium salts selected from these salts may be used.

At least one selected from the group consisting of the positive electrode 201, the electrolyte layer 202, and the negative electrode 203 may contain a nonaqueous electrolyte liquid, a gel electrolyte, or an ionic liquid for the purpose of facilitating the transfer of lithium ions and improving the output characteristics of the battery.

The nonaqueous electrolyte liquid includes a nonaqueous solvent and a lithium salt dissolved in the nonaqueous solvent.

Examples of the nonaqueous solvent are a cyclic carbonate ester solvent, a chain carbonate ester solvent, a cyclic ether solvent, a chain ether solvent, a cyclic ester solvent, a chain ester solvent, and a fluorine solvent. Examples of the cyclic carbonate ester solvent are ethylene carbonate, propylene carbonate, and butylene carbonate. Examples of the chain carbonate ester solvent are dimethyl carbonate, ethyl methyl carbonate, and diethyl carbonate. Examples of the cyclic ether solvent are tetrahydrofuran, 1,4-dioxane, and 1,3-dioxolane. Examples of the chain ether solvent are 1,2-dimethoxyethane and 1,2-diethoxyethane. An example of the cyclic ester solvent is γ-butyrolactone. An example of the chain ester solvent is ethyl acetate. Examples of the fluorine solvent are fluoroethylene carbonate, methyl fluoropropionate, fluorobenzene, fluoroethyl methyl carbonate, and fluorodimethylene carbonate. One nonaqueous solvent selected from these solvents may be used alone. Alternatively, a mixture of two or more nonaqueous solvents selected from these solvents may be used.

Examples of the lithium salt are $LiPF_6$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(SO_2C_4F_9)$, and $LiC(SO_2CF_3)_3$. One lithium salt selected from these salts may be used alone. Alternatively, a mixture of two or more lithium salts selected from these salts may be used. The concentration of the lithium salt is, for example, 0.5 mol/L or more and 2 mol/L or less.

As the gel electrolyte, a polymer material impregnated with a nonaqueous electrolyte liquid may be used. Examples of the polymer material are polyethylene oxide, polyacrylonitrile, polyvinylidene fluoride, polymethyl methacrylate, and a polymer having an ethylene oxide bond.

Examples of the cation included in the ionic liquid are:
(i) an aliphatic chain quaternary salt, such as tetraalkylammonium and tetraalkylphosphonium;
(ii) aliphatic cyclic ammonium, such as pyrrolidiniums, morpholiniums, imidazoliniums, tetrahydropyrimidiniums, piperaziniums, and piperidiniums; and
(iii) a nitrogen-containing heterocyclic aromatic cation, such as pyridiniums and imidazoliums.

Examples of the anion included in the ionic liquid are $PF_6^-$, $BF_4^-$, $SbF_6^-$, $AsF_6^-$, $SO_3CF_3^-$, $N(SO_2CF_3)_2^-$, $N(SO_2C_2F_5)_2^-$, $N(SO_2CF_3)(SO_2C_4F_9)^-$, and $C(SO_2CF_3)_3^-$.

The ionic liquid may contain a lithium salt.

At least one selected from the group consisting of the positive electrode 201, the electrolyte layer 202, and the negative electrode 203 may contain a binder for the purpose of improving the adhesion between individual particles.

Examples of the binder are polyvinylidene fluoride, polytetrafluoroethylene, polyethylene, polypropylene, an aramid resin, polyamide, polyimide, polyamideimide, polyacrylonitrile, polyacrylic acid, polyacrylic acid methyl ester, polyacrylic acid ethyl ester, polyacrylic acid hexyl ester, polymethacrylic acid, polymethacrylic acid methyl ester, polymethacrylic acid ethyl ester, polymethacrylic acid hexyl ester, polyvinyl acetate, polyvinylpyrrolidone, polyether, polyether sulfone, hexafluoropolypropylene, styrene butadiene rubber, and carboxymethyl cellulose. A copolymer may also be used as the binder. Examples of such the binder are copolymers of two or more materials selected from the group consisting of tetrafluoroethylene, hexafluoroethylene, hexafluoropropylene, perfluoroalkyl vinyl ether, vinylidene fluoride, chlorotrifluoroethylene, ethylene, propylene, pentafluoropropylene, fluoromethyl vinyl ether, acrylic acid, and hexadiene. A mixture of two or more selected from the above-mentioned materials may be used as the binder.

At least one selected from the positive electrode 201 and the negative electrode 203 may contain a conductive assistant for the purpose of enhancing the electron conductivity.

Examples of the conductive assistant are:
(i) graphites, such as natural graphite and artificial graphite;
(ii) carbon blacks, such as acetylene black and Ketjen black;
(iii) conductive fibers, such as carbon fibers and metal fibers;
(iv) carbon fluoride;
(v) metal powders, such as aluminum;
(vi) conductive whiskers, such as zinc oxide and potassium titanate;
(vii) a conductive metal oxide, such as titanium oxide; and
(viii) a conductive polymer compound, such as polyanion, polypyrrole, and polythiophene.

In order to reduce the cost, the conductive assistant of the above (i) or (ii) may be used.

Examples of the shape of the battery according to the second embodiment are coin type, cylindrical type, square type, sheet type, button type, flat type, and laminated type.

EXAMPLES

The present disclosure will now be described in more detail with reference to Examples.

Example 1

Production of Solid Electrolyte Material

LiCl, LiBr, $YCl_3$, $GdCl_3$, and $CaBr_2$ were prepared as raw material powders such that the molar ratio of LiCl:LiBr:$YCl_3$:$GdCl_3$:$CaBr_2$ was 1:1.9:0.6:0.4:0.05 in an argon atmosphere having a dew point of −60° C. or less (hereinafter, referred to as "dry argon atmosphere"). These raw material powders were pulverized and mixed in a mortar. Thus, a mixture powder was obtained. The mixture powder was milled with a planetary ball mill at 600 rpm for 12 hours. Thus, a solid electrolyte material powder of Example 1 was obtained. The solid electrolyte material of Example 1 had a composition represented by $Li_{2.9}Ca_{0.05}Y_{0.6}Gd_{0.4}Br_2Cl_4$.

The Li content per unit weight of the solid electrolyte material of Example 1 was measured by atomic absorption analysis. The Ca content, Y content, and Gd content in the solid electrolyte material of Example 1 were measured by high-frequency inductively coupled plasma emission spectrometry. The molar ratio of Li:Ca:Y:Gd was calculated based on the contents of Li, Ca, Y, and Gd obtained from these measurement results. As a result, the solid electrolyte material of Example 1 had a molar ratio of Li:Ca:Y:Gd of 2.9:0.05:0.6:0.4 as with the molar ratio in the raw material powders.

Evaluation of Ion Conductivity

Figure 2:
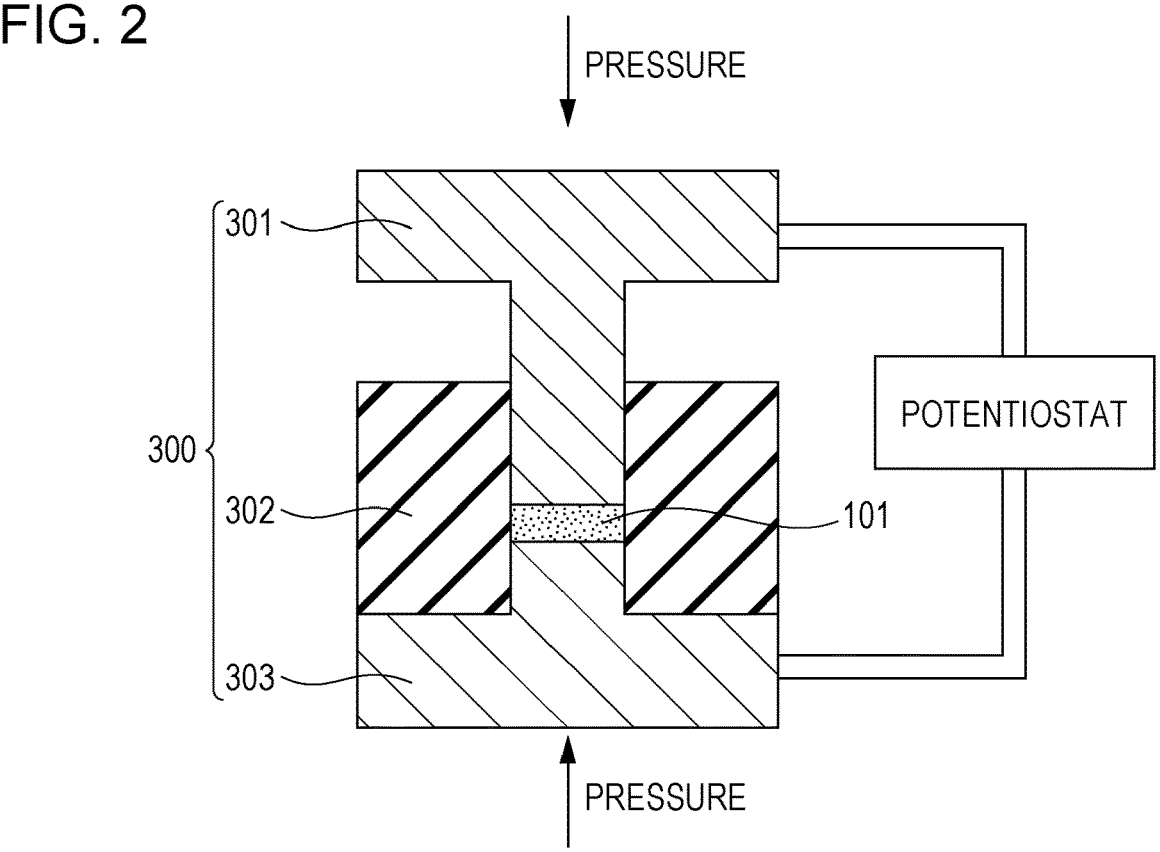
FIG. 2 is a schematic view of a compression molding dies 300 used for evaluation of the ion conductivity of a solid electrolyte material.

FIG. 2 is a schematic view of a compression molding dies 300 used for evaluation of the ion conductivity of a solid electrolyte material.

The compression molding dies 300 included a punch upper part 301, a die 302, and a punch lower part 303. The punch upper part 301 and the punch lower part 303 were both formed from electron-conductive stainless steel. The die 302 was formed from insulating polycarbonate.

The ion conductivity of the solid electrolyte material of Example 1 was measured using the compression molding dies 300 shown in FIG. 2 by the following method.

The powder of the solid electrolyte material of Example 1 (i.e., the powder 101 of the solid electrolyte material in FIG. 2) was loaded inside the compression molding dies 300 in a dry atmosphere having a dew point of −30° C. or less. A pressure of 300 MPa was applied to the solid electrolyte material of Example 1 inside the compression molding dies 300 using the punch upper part 301 and the punch lower part 303.

The punch upper part 301 and the punch lower part 303 were connected to a potentiostat (Princeton Applied Research, VersaSTAT4) equipped with a frequency response analyzer while applying the pressure. The punch upper part 301 was connected to the working electrode and the potential measurement terminal. The punch lower part 303 was connected to the counter electrode and the reference electrode. The impedance of a solid electrolyte material was measured by an electrochemical impedance measurement method at room temperature.

Figure 3:
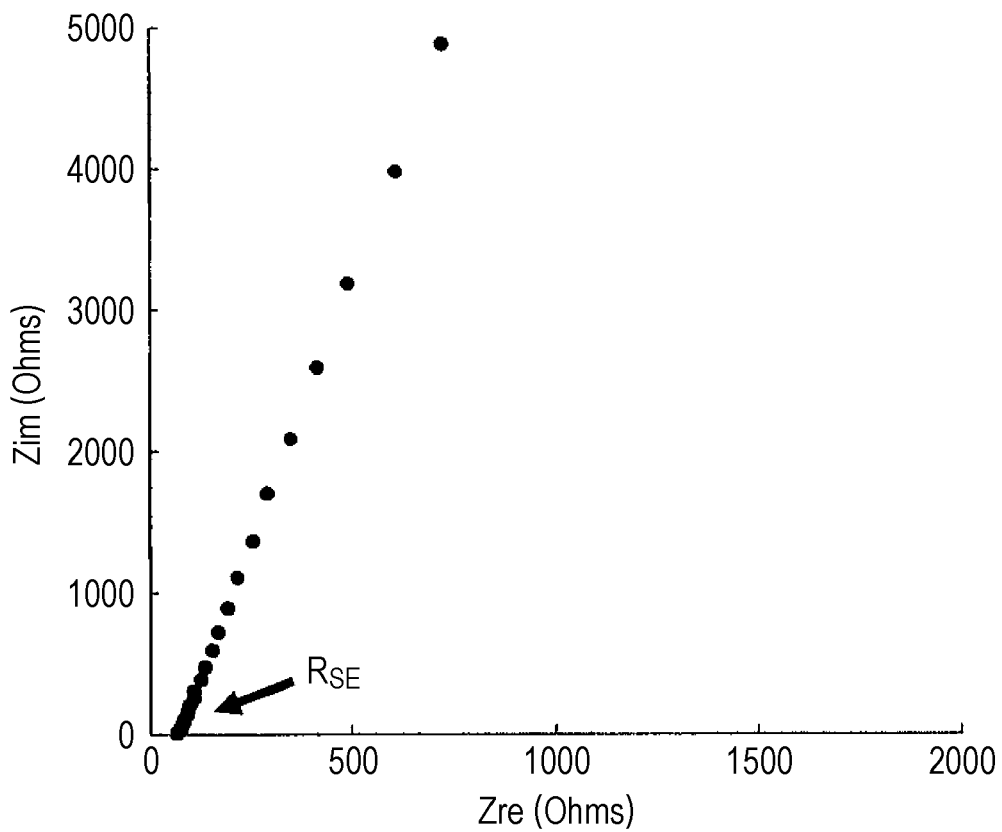
FIG. 3 is a graph showing a cole-cole chart of the impedance measurement results of the solid electrolyte material of Example 1.

FIG. 3 is a graph showing a cole-cole chart of the impedance measurement results.

In FIG. 3, the real value of impedance at the measurement point where the absolute value of the phase of the complex impedance was the smallest was regarded as the resistance value of the solid electrolyte material to ion conduction. Regarding the real value, see the arrow $R_{SE}$ shown in FIG. 3. The ion conductivity was calculated using the resistance value based on the following mathematical expression (2):

$$\sigma = (R_{SE} \times S / t)^{-1} \quad (2)$$

Here, σ represents ion conductivity. S represents the contact area of a solid electrolyte material with the punch upper part 301 (equal to the cross-sectional area of the hollow part of the die 302 in FIG. 2). $R_{SE}$ represents the resistance value of the solid electrolyte material in impedance measurement. t represents the thickness of the solid electrolyte material (i.e., in FIG. 2, the thickness of the layer formed from the powder 101 of the solid electrolyte material).

The ion conductivity of the solid electrolyte material of Example 1 measured at 22° C. was $1.10 \times 10^{-3}$ S/cm.

Production of Battery

The solid electrolyte material of Example 1 and $LiCoO_2$ were prepared at a volume ratio of 30:70 in an argon atmosphere. These materials were mixed in a mortar. Thus, a mixture was obtained.

The solid electrolyte material (100 mg) of Example 1, the above mixture (10 mg), and an aluminum powder (14.7 mg) were stacked in this order in an insulating tube having an inner diameter of 9.5 mm. A pressure of 300 MPa was applied to this laminate to form a solid electrolyte layer and a first electrode. The solid electrolyte layer had a thickness of 500 μm.

Subsequently, metal In (thickness: 200 μm) was stacked on the solid electrolyte layer. A pressure of 80 MPa was applied to this laminate to form a second electrode.

Subsequently, a current collector formed from stainless steel was attached to the first electrode and the second electrode, and current collecting lead was attached to the current collector.

Finally, the inside of the insulating tube was isolated from the outside atmosphere using an insulating ferrule to seal the inside of the tube. Thus, a battery of Example 1 was obtained.

Charge and Discharge Test

Figure 4:
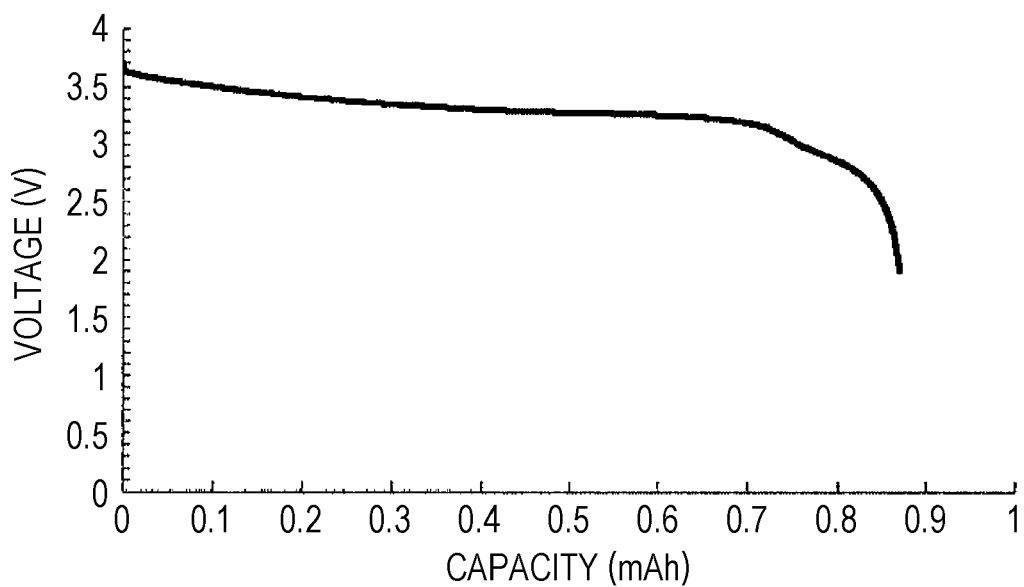
FIG. 4 is a graph showing the initial discharge characteristics of the battery of Example 1.

FIG. 4 is a graph showing the initial discharge characteristics of the battery of Example 1. The initial charge and discharge characteristics were measured by the following method.

The battery of Example 1 was placed in a thermostat of 25° C.

The battery of Example 1 was charged with a current density of 72 μA/cm² until the voltage reached 3.7 V. The current density corresponded to 0.05 C rate.

Subsequently, the battery of Example 1 was discharged at a current density of 72 μA/cm² until the voltage reached 1.9 V.

As the results of the charge and discharge test, the battery of Example 1 had an initial discharge capacity of 0.89 mAh.

Examples 2 to 21

Production of Solid Electrolyte Material

In Examples 2 to 19, LiCl, LiBr, $YCl_3$, $GdCl_3$, and $CaBr_2$ were prepared as the raw material powders such that the molar ratio of LiCl:LiBr:$YCl_3$:$GdCl_3$:$CaBr_2$ was (c−3d):(6−2a−c):(1−b)d:bd:a.

In Examples 20 and 21, LiCl, LiBr, $YCl_3$, $GdCl_3$, and $CaBr_2$ were prepared as the raw material powders such that the molar ratio of LiCl:LiBr:$YBr_3$:$GdBr_3$:$CaBr_2$ was c:(6−2a−c−3d):(1−b)d:bd:a.

Solid electrolyte materials of Examples 2 to 21 were obtained as in Example 1 except the above matters. The values of a, b, c, and d are shown in Table 1.

Evaluation of Ion Conductivity

The ion conductivities of the solid electrolyte materials of Examples 2 to 21 were measured as in Example 1. The measurement results are shown in Table 1.

Charge and Discharge Test

Batteries of Examples 2 to 21 were obtained as in Example 1 using the solid electrolyte materials of Examples 2 to 21. The batteries of Examples 2 to 21 were well charged and discharged as in the battery of Example 1.

Comparative Examples 1 to 8

Production of Solid Electrolyte Material

In Comparative Example 1, LiCl and $YCl_3$ were prepared as the raw material powders such that the molar ratio of LiCl:$YCl_3$ was 3:1.

In Comparative Example 2, LiCl, LiBr, and $YCl_3$ were prepared as the raw material powders such that the molar ratio of LiCl:LiBr:$YCl_3$ was 1:2:1.

In Comparative Example 3, LiCl, LiBr, and $GdCl_3$ were prepared as the raw material powders such that the molar ratio of LiCl:LiBr:$GdCl_3$ was 1:2:1.

In Comparative Examples 4 and 5, LiCl, LiBr, $YCl_3$, and $CaBr_2$ were prepared as the raw material powders such that the molar ratio of LiCl:LiBr:$YCl_3$:$CaBr_2$ was (c−3d):(6−2a−c):(1−b)d:a.

In Comparative Examples 6 to 8, LiCl, LiBr, $YCl_3$, and $GdCl_3$ were prepared as the raw material powders such that the molar ratio of LiCl:LiBr:$YCl_3$:$GdCl_3$ was (c−3d):(6−2a−c):(1−b)d:bd.

Solid electrolyte materials of Comparative Examples 1 to 8 were obtained as in Example 1 except the above matters. The values of a, b, c, and d are shown in Table 2.

Evaluation of Ion Conductivity

The ion conductivities of the solid electrolyte materials of Comparative Examples 1 to 8 were measured as in Example 1. The measurement results are shown in Table 2.

TABLE 1

| | Composition | a | b | c | d | Ion conductivity (S/cm) |
|---|---|---|---|---|---|---|
| Example 1 | $Li_{2.9}Ca_{0.05}Y_{0.6}Gd_{0.4}Br_2Cl_4$ | 0.05 | 0.4 | 4 | 1 | $1.10 \times 10^{-3}$ |
| Example 2 | $Li_{2.9}Ca_{0.05}Y_{0.5}Gd_{0.5}Br_2Cl_4$ | 0.05 | 0.5 | 4 | 1 | $1.02 \times 10^{-3}$ |
| Example 3 | $Li_{2.9}Ca_{0.05}Y_{0.4}Gd_{0.6}Br_2Cl_4$ | 0.05 | 0.6 | 4 | 1 | $9.11 \times 10^{-4}$ |
| Example 4 | $Li_{2.8}Ca_{0.1}Y_{0.5}Gd_{0.5}Br_2Cl_4$ | 0.1 | 0.5 | 4 | 1 | $1.09 \times 10^{-3}$ |
| Example 5 | $Li_{2.7}Ca_{0.15}Y_{0.5}Gd_{0.5}Br_2Cl_4$ | 0.15 | 0.5 | 4 | 1 | $9.68 \times 10^{-4}$ |
| Example 6 | $Li_{2.6}Ca_{0.2}Y_{0.5}Gd_{0.5}Br_2Cl_4$ | 0.2 | 0.5 | 4 | 1 | $9.17 \times 10^{-4}$ |
| Example 7 | $Li_{2.4}Ca_{0.3}Y_{0.5}Gd_{0.5}Br_2Cl_4$ | 0.3 | 0.5 | 4 | 1 | $8.17 \times 10^{-4}$ |
| Example 8 | $Li_{2.8}Ca_{0.1}Y_{0.9}Gd_{0.1}Br_2Cl_4$ | 0.1 | 0.1 | 4 | 1 | $8.84 \times 10^{-4}$ |
| Example 9 | $Li_{2.8}Ca_{0.1}Y_{0.7}Gd_{0.3}Br_2Cl_4$ | 0.1 | 0.3 | 4 | 1 | $8.98 \times 10^{-4}$ |
| Example 10 | $Li_{2.8}Ca_{0.1}Y_{0.6}Gd_{0.4}Br_2Cl_4$ | 0.1 | 0.4 | 4 | 1 | $8.01 \times 10^{-4}$ |
| Example 11 | $Li_{2.8}Ca_{0.1}Y_{0.4}Gd_{0.6}Br_2Cl_4$ | 0.1 | 0.6 | 4 | 1 | $8.12 \times 10^{-4}$ |
| Example 12 | $Li_{2.8}Ca_{0.1}Y_{0.3}Gd_{0.7}Br_2Cl_4$ | 0.1 | 0.7 | 4 | 1 | $8.98 \times 10^{-4}$ |
| Example 13 | $Li_{2.8}Ca_{0.1}Y_{0.1}Gd_{0.9}Br_2Cl_4$ | 0.1 | 0.9 | 4 | 1 | $8.83 \times 10^{-4}$ |
| Example 14 | $Li_{3.4}Ca_{0.1}(Y_{0.4}Gd_{0.6})_{0.8}Br_2Cl_4$ | 0.1 | 0.6 | 4 | 0.8 | $8.11 \times 10^{-4}$ |
| Example 15 | $Li_{3.1}Ca_{0.1}(Y_{0.4}Gd_{0.6})_{0.9}Br_2Cl_4$ | 0.1 | 0.6 | 4 | 0.9 | $9.22 \times 10^{-4}$ |
| Example 16 | $Li_{2.5}Ca_{0.1}(Y_{0.4}Gd_{0.6})_{1.1}Br_2Cl_4$ | 0.1 | 0.6 | 4 | 1.1 | $1.01 \times 10^{-4}$ |
| Example 17 | $Li_{2.2}Ca_{0.1}(Y_{0.4}Gd_{0.6})_{1.2}Br_2Cl_4$ | 0.1 | 0.6 | 4 | 1.2 | $1.21 \times 10^{-3}$ |
| Example 18 | $Li_{2.8}Ca_{0.1}Y_{0.5}Gd_{0.5}BrCl_5$ | 0.1 | 0.5 | 5 | 1 | $9.01 \times 10^{-4}$ |
| Example 19 | $Li_{2.8}Ca_{0.1}Y_{0.5}Gd_{0.5}Br_3Cl_3$ | 0.1 | 0.5 | 3 | 1 | $9.11 \times 10^{-4}$ |
| Example 20 | $Li_{2.8}Ca_{0.1}Y_{0.5}Gd_{0.5}Br_4Cl_2$ | 0.1 | 0.5 | 2 | 1 | $9.55 \times 10^{-4}$ |
| Example 21 | $Li_{2.8}Ca_{0.1}Y_{0.5}Gd_{0.5}Br_5Cl$ | 0.1 | 0.5 | 1 | 1 | $8.55 \times 10^{-4}$ |

TABLE 2

| | Composition | a | b | c | d | Ion conductivity (S/cm) |
|---|---|---|---|---|---|---|
| Comparative Example 1 | $Li_3YCl_6$ | 0 | 0 | 6 | 1 | $5.70 \times 10^{-4}$ |
| Comparative Example 2 | $Li_3YBr_2Cl_4$ | 0 | 0 | 4 | 1 | $7.09 \times 10^{-4}$ |
| Comparative Example 3 | $Li_3GdBr_2Cl_4$ | 0 | 1 | 4 | 1 | $2.71 \times 10^{-4}$ |
| Comparative Example 4 | $Li_{2.8}Ca_{0.1}YBr_2Cl_4$ | 0.1 | 0 | 4 | 1 | $7.96 \times 10^{-4}$ |
| Comparative Example 5 | $Li_{2.6}Ca_{0.2}YBr_2Cl_4$ | 0.2 | 0 | 4 | 1 | $7.40 \times 10^{-4}$ |
| Comparative Example 6 | $Li_3Y_{0.9}Gd_{0.1}Br_2Cl_4$ | 0 | 0.1 | 4 | 1 | $7.97 \times 10^{-4}$ |
| Comparative Example 7 | $Li_3Y_{0.5}Gd_{0.5}Br_2Cl_4$ | 0 | 0.5 | 4 | 1 | $7.98 \times 10^{-4}$ |
| Comparative Example 8 | $Li_3Y_{0.1}Gd_{0.9}Br_2Cl_4$ | 0 | 0.9 | 4 | 1 | $6.21 \times 10^{-4}$ |

Consideration

As obvious from Table 1, the solid electrolyte materials of Examples 1 to 21 have high ion conductivities of $8 \times 10^{-4}$ S/cm or more at around room temperature.

As obvious by comparing Examples 2 and 4 to 7 with Comparative Example 7, a solid electrolyte material has a high ion conductivity when the value of "a" representing the molar fraction of Ca is 0.05 or more and 0.3 or less. As obvious by comparing Examples 2 and 4 to 6 with Example 7, the ion conductivity is further enhanced when the value of "a" is 0.05 or more and 0.2 or less. As obvious by comparing Examples 2, 4, and 5 with Example 6, the ion conductivity is further enhanced when the value of "a" is 0.05 or more and 0.15 or less. As obvious by comparing Examples 2 and 4 with Example 5, the ion conductivity is further enhanced when the value of "a" is 0.05 or more and 0.1 or less.

It is inferred that a solid electrolyte material has a high ion conductivity even if the value of "a" is less than 0.05. The value of "a" may be, for example, 0.01 or more and 0.3 or less.

As obvious by comparison of Examples 11 and 14 to 17, a solid electrolyte material has a high ion conductivity when the value of "d" representing the amount of Li deficiency or excess from the stoichiometric ratio is 0.8 or more and 1.2 or less. As obvious by comparing Examples 16 and 17 with Examples 11, 14, and 15, the ion conductivity is further enhanced when the value of "d" is 1.1 or more and 1.2 or less.

In all Examples 1 to 21, the batteries were charged and discharged at room temperature.

Since the solid electrolyte materials of Examples 1 to 21 do not contain sulfur, hydrogen sulfide does not occur.

As described above, the solid electrolyte material of the present disclosure has a high lithium ion conductivity and is suitable for providing a battery that can be well charged and discharged.

The solid electrolyte material of the present disclosure is used in, for example, a battery (e.g., an all solid lithium ion secondary battery).

What is claimed is:

1. A solid electrolyte material comprising:
Li, Ca, Y, Gd, and X, wherein
X is at least one element selected from the group consisting of F, Cl, Br, and I.

2. The solid electrolyte material according to claim 1, wherein
X is at least one element selected from the group consisting of Cl and Br.

3. The solid electrolyte material according to claim 1, represented by a following composition formula (1):

$$Li_{6-2a-3d}Ca_a(Y_{1-b}Gd_b)_dBr_{6-c}Cl_c \quad (1)$$

here, following mathematical expressions:
$0<a<3$;
$0<b<1$;
$0<c<6$; and
$0<d<1.5$
are satisfied.

4. The solid electrolyte material according to claim 3, wherein
a mathematical expression: $0.01 \le a \le 0.3$ is satisfied.

5. The solid electrolyte material according to claim 4, wherein
a mathematical expression: $0.05 \le a \le 0.3$ is satisfied.

6. The solid electrolyte material according to claim 4, wherein
a mathematical expression: $0.01 \le a \le 0.2$ is satisfied.

7. The solid electrolyte material according to claim 3, wherein a mathematical expression: $0.8 \leq d \leq 1.2$ is satisfied.

8. The solid electrolyte material according to claim 7, wherein a mathematical expression: $1.1 \leq d \leq 1.2$ is satisfied.

9. A battery comprising:

a positive electrode;

a negative electrode; and an electrolyte layer disposed between the positive electrode and the negative electrode, wherein at least one selected from the group consisting of the positive electrode, the negative electrode, and the electrolyte layer contains the solid electrolyte material according to claim 1.

* * * * *